(No Model.)

D. H. SULLIVAN & W. H. OSBORN.
CAR BRAKE.

No. 502,476. Patented Aug. 1, 1893.

Witnesses:
H. E. N. Bates
A. M. Kelly

Inventors
Daniel H. Sullivan
William H. Osborn
By Church & Church
Att'ys.

UNITED STATES PATENT OFFICE.

DANIEL H. SULLIVAN AND WILLIAM H. OSBORN, OF ROCHESTER, NEW YORK.

CAR-BRAKE.

SPECIFICATION forming part of Letters Patent No. 502,476, dated August 1, 1893.

Application filed May 27, 1893. Serial No. 475,729. (No model.)

*To all whom it may concern:*

Be it known that we, DANIEL H. SULLIVAN and WILLIAM H. OSBORN, of Rochester, in the county of Monroe and State of New York, have invented certain new and useful Improvements in Car-Brakes; and we do hereby declare the following to be a full, clear, and exact description of the same, reference being had to the accompanying drawings, forming a part of this specification, and to the reference-numerals marked thereon.

Our present invention has for its object to provide an improved car-brake particularly adapted for use on street railway-cars, whereby the movement of the car may be arrested suddenly when an emergency stop becomes necessary, embodying a means for positively gripping the track and preferably the car-wheels as well, and to these and other ends it consists in certain improvements in constructions and combinations of parts, all as will be hereinafter fully described and the novel features pointed out in the claims at the end of this specification.

Figure 1:
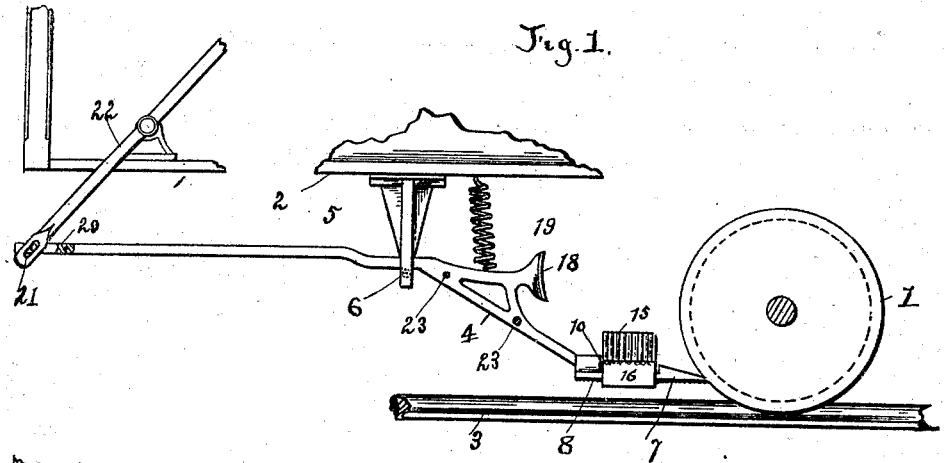
Figure 2:
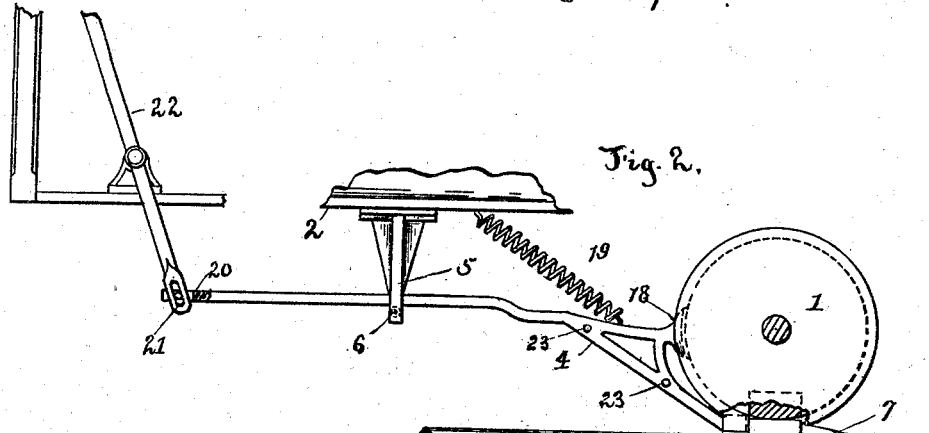
Figure 3:
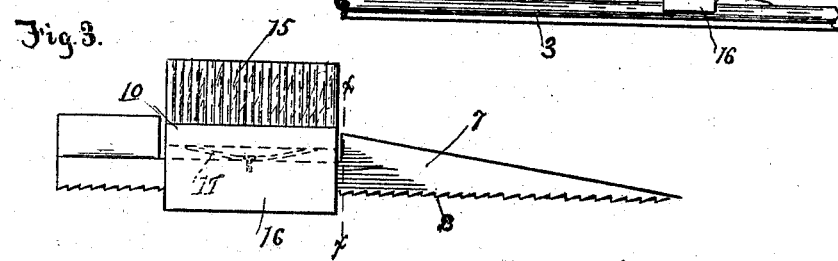
Figures 4, 5:
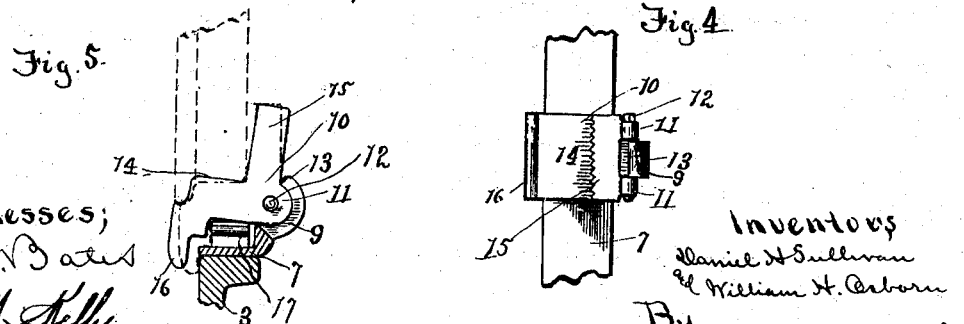

In the drawings: Figure 1 is a sectional view through a portion of a car, looking from the inside, showing our brake; Fig. 2, a similar view of the brake applied; Fig. 3, an enlarged side elevation of the brake-shoe; Fig. 4, a plan view of the same; Fig. 5, a sectional view on the line $x$—$x$ of Fig. 2.

Similar reference numerals in the several figures indicate similar parts.

The supporting wheels of the car are indicated by 1 and may be attached to the ordinary truck on which the cars are mounted with interposed springs, as usual, and 2 indicates a support for the brake, whether it be the underside of the car-body itself, or a portion of the frame or truck on which the wheels are mounted. Arranged upon each side of the car and preferably substantially in line with the wheels thereof is located a longitudinally movable frame or bar 4 supported in a suitable bracket or hanger 5, preferably having a friction roller 6 therein; said bar having secured to or formed upon it a wedge-shaped shoe 7 arranged with its point projecting toward the wheel and preferably serrated on its under side at 8 in order to more firmly grip the track when applied thereto. Upon its inner side, this shoe is preferably provided with a projecting lug 9 upon which is pivoted a bell-crank lever 10 having lugs 11 through which and the projection 9 passes, a pivot bolt 12 securing the parts together, and permitting said lever to turn on the bolt as a pivot, a suitable stop-projection 13 preventing excessive movement of said lever. This lever 10 is provided with a tread or surface 14, which, when the lever is turned inward, is substantially horizontal and slightly above the rear portion of the upper surface of the wedge or shoe, as shown in Fig. 1, and it is also provided with an upper arm or extension 15 serrated on its inner edge, as shown, and a downward extension 16 on its outer side projecting below the lower surface of the wedge or shoe 7. A spring 17 is arranged between the upper part of the shoe 7 and the lower part of the lever, adapted to turn the lever on its pivot to the position shown in full lines Fig. 5 and hold the upper extension in contact with the stop 13 when the brake is not in operation. The inner face of the downward projection 16 is also roughened or provided with corrugations for the purpose of gripping positively the track 3.

Secured upon the upper part of the frame or bar 4 is a projection 18, arranged, when the shoe 7 is placed in contact with the track under the wheel, to engage the tread of the wheel and prevent excessive movement of the wedge under the wheel, and also secured to said bar is a spiral spring 19 one end of which is connected to the supporting frame or body of the car and adapted to lift the bar or frame 4 to the position shown in full lines Fig. 1, when the brake is in normal position. Pivoted to the outer end of the bar 4 is a yoke 20 having a cross-pin operating in the slot 21 in the lever 22 pivoted on the car-body, or other suitable support; said lever serving as a means for actuating the bar 4 longitudinally to project the shoe 7 between the wheels and track, as will be explained. In practice we prefer to employ two of these wedges or track-shoes at each end of the car, one arranged in front of each wheel, and to connect the pair at each end by cross-rods or bars 23, as shown in Fig. 1, so as to cause their simultaneous operation.

The operation will now be readily understood. The track-shoes and their supporting bars being held elevated by the springs 19, as shown in Fig. 1, when the operator desires to make a sudden stop, as in the event of an obstruction on the track, he moves the lever 22 to the position shown in Fig. 2, thereby moving the track-shoes down between the wheels and the track. The serrations on the bottom of the track-shoes will cause them to bind on the track and the wheels will run upon the inclined upper surface of the shoe until arrested by the stop or shoe 18. When the wheels run up the incline a short distance they encounter the flat portion or tread 14 of the pivot levers 10 and turn the latter on their pivots against the tension of the springs 17 and thereby bringing the upper part 15 against the outer face of the wheel, and the inner depending portion 16 into contact with the side of the rail, as shown in Fig. 5, gripping the latter and arresting the movement of the car.

Inasmuch as this brake is intended more particularly for emergency stops, it will be necessary to move the car backward causing the wheels to roll off the track-wedges when the levers may be operated and the track-shoes returned to normal position.

It will be understood that the rail shoes are simply supports for the rail-gripping levers and though their wedge-shaped ends enable the wheels to roll upon them, the primary object being the operation of the rail-gripping lever, the shape of said ends could be changed without departing from the spirit of our invention.

We claim as our invention—

1. In a car-brake, the combination with the rail-shoe, of the rail-gripping lever pivoted thereon having the downward extension for engaging the side of the rail and the tread engaged by the wheel, substantially as described.

2. In a car-brake, the combination with the wedge-shaped rail-shoe, of the gripping lever pivoted thereon having the extensions on opposite sides, one for engaging the wheel and the other the rail, substantially as described.

3. In a car-brake, the combination with the rail-shoe, of the rail-gripping lever pivoted thereon having the tread for the wheel, and the downward extension engaging the side of the rail, and the spring for turning the lever on its pivot, substantially as described.

4. In a car-brake, the combination with the wedge-shaped rail-shoe, of the gripping lever pivoted thereon having the tread for the wheel, and the extension engaging the side of the rail, the bar supporting the rail-shoe, and operating means for moving it between the rail and wheel, substantially as described.

5. In a car-brake, the combination with the rail-shoe, and its support, and the stop on the support for engaging the wheel and limiting the movement of the rail-shoe, of the rail-gripping lever pivoted on the rail-shoe having the tread for the wheel, and the extension engaging the side of the rail, substantially as described.

6. In a car-brake, the combination with the longitudinally movable bar having the rail-shoe and the rail-gripping lever thereon, of the supporting spring connected to the bar, the guide or support for the bar, and the operating lever, substantially as described.

DANIEL H. SULLIVAN.
WILLIAM H. OSBORN.

Witnesses:
FRED F. CHURCH,
G. A. RODA.